US012311991B2

(12) United States Patent
Lukito

(10) Patent No.: US 12,311,991 B2
(45) Date of Patent: May 27, 2025

(54) REMOVABLE PORTABLE CART WITH LIFTING SYSTEM

(71) Applicant: Harsoyo Lukito, Orange, CA (US)

(72) Inventor: Harsoyo Lukito, Orange, CA (US)

( * ) Notice: Subject to any disclaimer, the term of this patent is extended or adjusted under 35 U.S.C. 154(b) by 296 days.

(21) Appl. No.: 17/833,573

(22) Filed: Jun. 6, 2022

(65) Prior Publication Data

US 2023/0391388 A1    Dec. 7, 2023

(51) Int. Cl.
*B62B 3/06* (2006.01)
*A47B 9/20* (2006.01)
*A47B 31/00* (2006.01)
*B62B 5/00* (2006.01)
*B66F 11/04* (2006.01)

(52) U.S. Cl.
CPC .............. *B62B 3/0618* (2013.01); *A47B 9/20* (2013.01); *A47B 31/00* (2013.01); *B62B 5/0086* (2013.01); *B66F 11/04* (2013.01); *B62B 2202/30* (2013.01)

(58) Field of Classification Search
CPC .............................. B62B 3/0618; B62B 3/022
USPC ............................................ 280/6.155, 6.156
See application file for complete search history.

(56) References Cited

U.S. PATENT DOCUMENTS

| | | | | |
|---|---|---|---|---|
| 4,247,126 A | * | 1/1981 | Claxton | B60G 17/01925 |
| | | | | 172/395 |
| 7,354,067 B2 | * | 4/2008 | Majkrzak | E02F 9/085 |
| | | | | 280/765.1 |
| 10,532,756 B1 | * | 1/2020 | Rekhviashvili | B62B 3/10 |
| 10,875,561 B1 | * | 12/2020 | Marker | B62B 3/04 |
| 2020/0216104 A1 | * | 7/2020 | Leblanc | B62B 3/02 |

* cited by examiner

*Primary Examiner* — Jonathan Snelting
(74) *Attorney, Agent, or Firm* — Raymond Sun

(57) ABSTRACT

A portable cart has a frame assembly having a front end, a rear end, and a plurality of vertical beams. A front leg assembly having a pair of extendable front legs is secured adjacent the front end of the frame assembly, and a rear leg assembly having a pair of extendable rear legs is assembly secured adjacent the rear end of the frame assembly. A table top is secured to the frame assembly.

5 Claims, 15 Drawing Sheets

REMOVABLE PORTABLE CART WITH LIFTING SYSTEM

BACKGROUND OF THE INVENTION

1. Field of the Invention

The present invention relates to a portable cart, and in particular, to a lifting system that can be used to lift and lower a removable portable cart from the bed of a truck.

2. Description of the Prior Art

Conventional pickup trucks are often used to carry work tools and work benches that be unloaded for use at a job site. Conventional pickup trucks have a truck bed that can be used for storage or for carrying items that can be removed from the truck bed.

A portable cart as the term is used herein can be defined as simply as a structure frame on wheels with a table top or a work surface that can easily move around. The portable cart can be provided with or without a built-in storage container, toolbox, or display drawers. As used herein, the term "removable" means that the portable cart can be removed from the truck bed to the ground, and uplifted to be loaded back on the truck bed. The table top for the portable cart can be used as a workbench or display cabinet. In this regard, a portable cart with a tabletop can be considered as a workbench. A workbench has a flat surface where work is performed typically by contractors (mechanics, machinists, or carpenters). A portable cart with a glass top can be considered a display cabinet for a trade show.

Portable carts are very useful for trade display cabinets with multiple drawers. It is particularly useful for job-site work as they provide the worker or contractor with a table that can be used, in addition to providing possible storage for tools or other equipment. Unfortunately, keeping the portable cart as a workbench or display cabinet at an ideal ergonomic height without any actuators protruding out beyond the table top is a challenge. Most truck beds are provided at predetermined heights, which are about the same as an ergonomic working height. Therefore, the challenge is to accomplish the following: (i) lift and lower the portable cart safely from the truck bed to the ground and vice versa, and (ii) once the portable cart is on the ground, lower the portable cart to an ideal working height without any actuators protruding from the table top.

To accomplish the lifting and lowering of a portable cart, there are at least four adjustable legs. The four adjustable legs of the portable cart need to be extended and retracted allow the two rear legs to extend to the ground first when they extend horizontally beyond the tailgate of the truck bed, and then the two front legs to be extended to the ground after they clear the tailgate as well. Actuators such as hydraulic, pneumatic, and mechanical screws can be used to lengthen and shorten the legs of the portable cart.

An ideal height Hb for a workbench is between 38 to 42 inches (965 to 1,067 mm) and a typical height Ht for a truck bed is about 34 inches (864 mm) or less when the truck is loaded (worst case scenario). A single actuator, when fully extended (100% stroke), may not have enough stroke or will not be stable enough to move a portable cart to and from the truck bed during the retrieving or stowing process. For an actuator to be stable, the actuator stroke should not be stroking more than 70% of the total stroke (length), leaving the 30% piston rod to be engaging to the actuator body (bore). Therefore, if the truck bed height to the ground is 34 inches (864 mm), then the actuator length (stroke) should be 34 inches/70%, which is equal to 48.6 inches (1,234 mm), and the actual overall actuator length will be more than 53 inches (1,346 mm). Since an ideal workbench height is about 40+/−2 inches (1016+/−25 mm), a single actuator will not work for a truck bed that has a height of about 34 inches if none of the actuators are allowed to be protruded beyond the workbench table top height.

Thus, there remains a need for a system that can effectively load and unload a removable portable cart from the bed of a truck.

SUMMARY OF THE DISCLOSURE

It is an object of the present invention to provide a system that can effectively lift and lower a removable portable cart from the bed of a truck so that the portable cart can be used as a workbench or trade show display cabinet without having any actuators protruding beyond the table top.

In order to accomplish the objects of the present invention, there is provided a portable cart having a frame assembly having a front end, a rear end, and a plurality of vertical beams. A front leg assembly having a pair of extendable front legs is secured adjacent the front end of the frame assembly, and a rear leg assembly having a pair of extendable rear legs is assembly secured adjacent the rear end of the frame assembly. A table top is secured to the frame assembly.

The present invention also provides a method of unloading the portable cart from the bed of a truck. The tailgate of the truck is first opened, and then the portable cart is moved towards the tailgate until the rear leg assembly is off the tailgate. The rear legs are extended until the rear legs contact the ground. Next, the portable cart is continued to be moved towards the tailgate until the front leg assembly clears the tailgate, and then the front legs are extended until the front legs contact the ground.

According to one embodiment of the present invention, each leg assembly has a left dual cylinder assembly and a right dual cylinder assembly, with each cylinder assembly having two cylinders positioned side-by-side.

According to another embodiment of the present invention, the frame assembly has at least a first set of vertical beams positioned at the front end of the frame assembly, a fourth set of vertical beams positioned at the rear end of the frame assembly, a second set of vertical beams positioned spaced apart from the first set of vertical beams, and a third set of vertical beams positioned between the second and fourth sets of vertical beams. At least one fixed caster assembly is secured to the first and third sets of vertical beams, the front leg assembly is secured to the second set of vertical beams, and the rear leg assembly is secured to the fourth set of vertical beams.

DETAILED DESCRIPTION OF THE PREFERRED EMBODIMENTS

Figure 1:
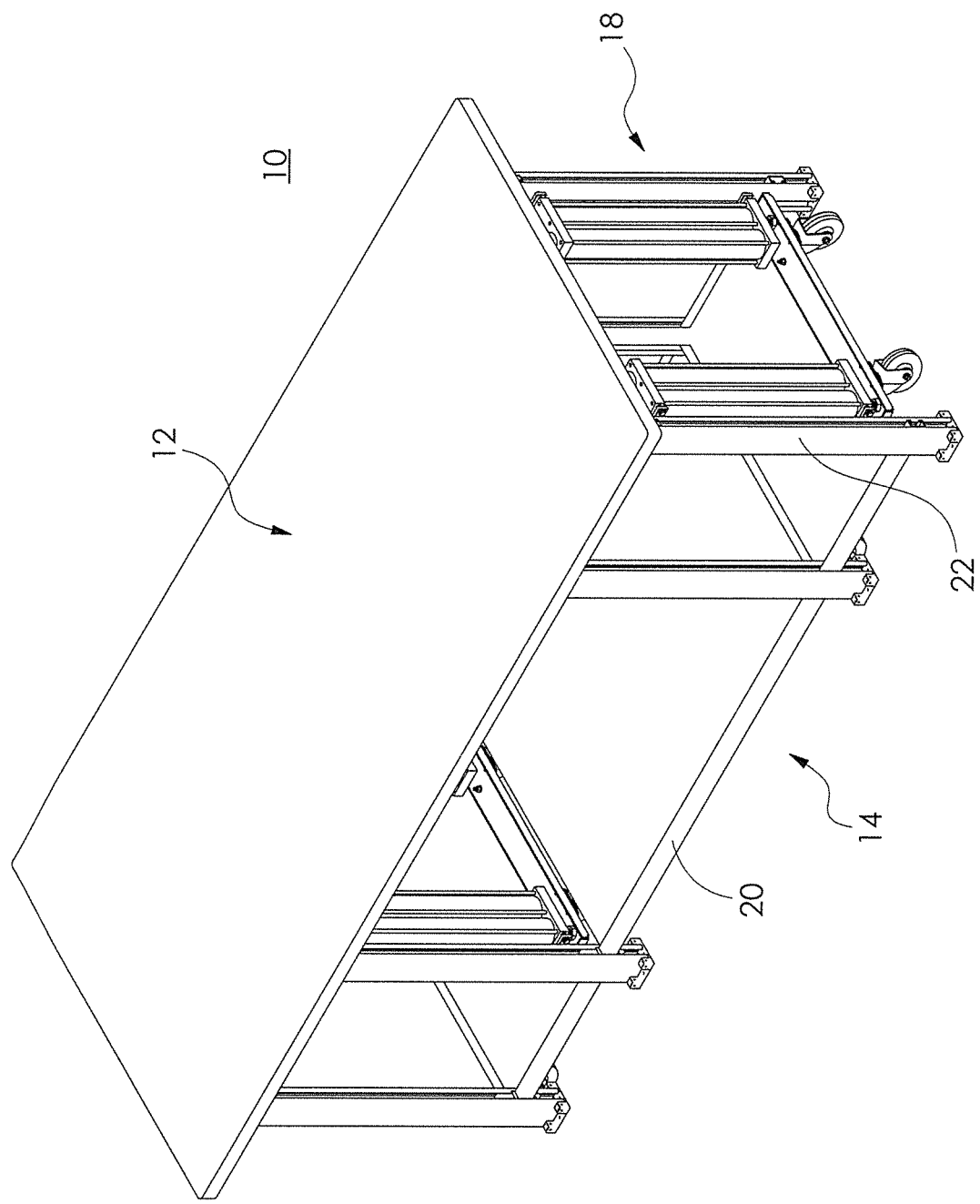
FIG. 1 is a top perspective view of a portable cart according to one embodiment of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1-5 illustrate a portable cart 10 according to one embodiment of the present invention. The cart 10 has a table top 12, a supporting frame assembly 14, a front leg assembly 16 and a rear leg assembly 18. The table top 12 is secured on top of the frame assembly 14, the front leg assembly 16 is secured to the front end of the frame assembly 14, and the rear leg assembly 18 is secured to the rear end of the frame assembly 14.

The frame assembly 14 can be made from an arrangement of a plurality of horizontal beams 20 and vertical beams 22 that can be the same beams described in U.S. Pat. No. 11,162,261, whose disclosure is incorporated by this reference as though set forth fully herein. The table top 12 can be secured to the top of the vertical beams 22 using mechanisms that are well-known in the art, and will not be described in greater detail herein. The front leg assembly 16 is secured to the channels in the vertical beams 22 closer to the front end (but not at the front end) of the frame assembly 14, and the rear leg assembly 18 is secured to the channels of the vertical beams 22 at the rear end of the frame assembly 14, as described in greater detail below.

Even though the portable cart 10 is described as a workbench having a table top and four legs, the principles of the present invention can also be applied to a storage cart having a top surface that can be used as a table top, and having storage cabinets, drawers or containers underneath the top surface. For example, the frame assembly 14 can be modified to support and enclose a storage cabinet or container that can be comprised of an interior storage space with doors, or drawers, or a combination of both. The leg assemblies 16 and 18 can still be provided at the front and rear ends of the frame assembly 14.

The front and rear leg assemblies 16 and 18 can be identical, and operate under the same general principle, which is to have back-to-back actuator cylinders stroking at opposite directions at less than 70% stroke for each actuator cylinder to accomplish this task. If the total stroke is 38 inches (965 mm), a back-to-back actuator stroke will be 38/2=19 inches (483 mm), stroking at 70%, then the stroke length per actuator will be 19/70%=27 inches (698 mm). This realistically allows the portable cart to be lowered to less than 38 inches (965 mm). Since the total stroke needed to load and unload a portable cart 10 from a standard truck bed is 34 inches (864 mm), and the height of the cart 10 is 38 inches, so the two actuators (cylinders) operating side-by-side with opposite strokes can accomplish the task effectively.

Figure 3:
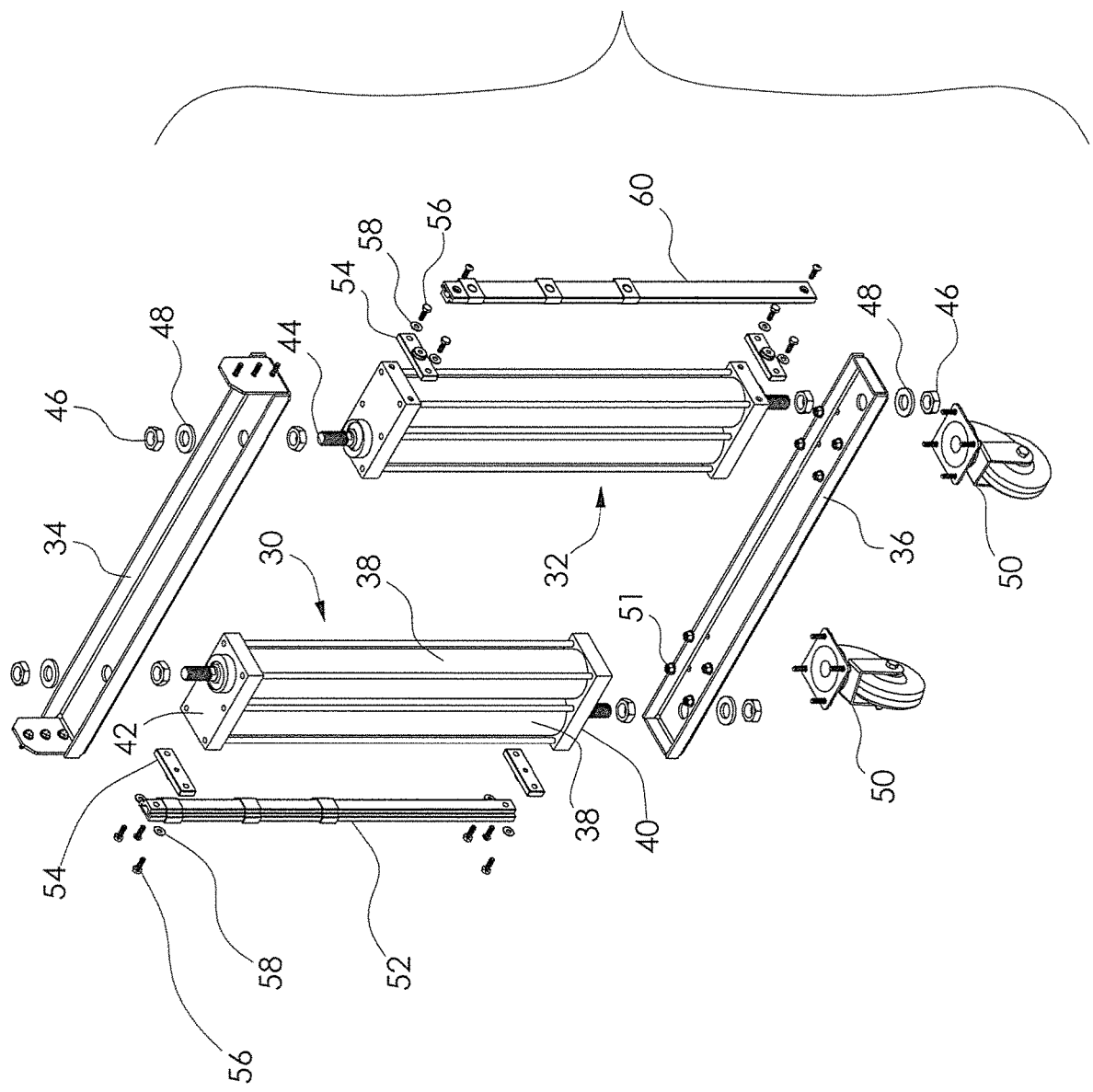
FIG. 3 is an exploded perspective view of one of the leg assemblies of the cart of FIG. 1.
Figure 7A:
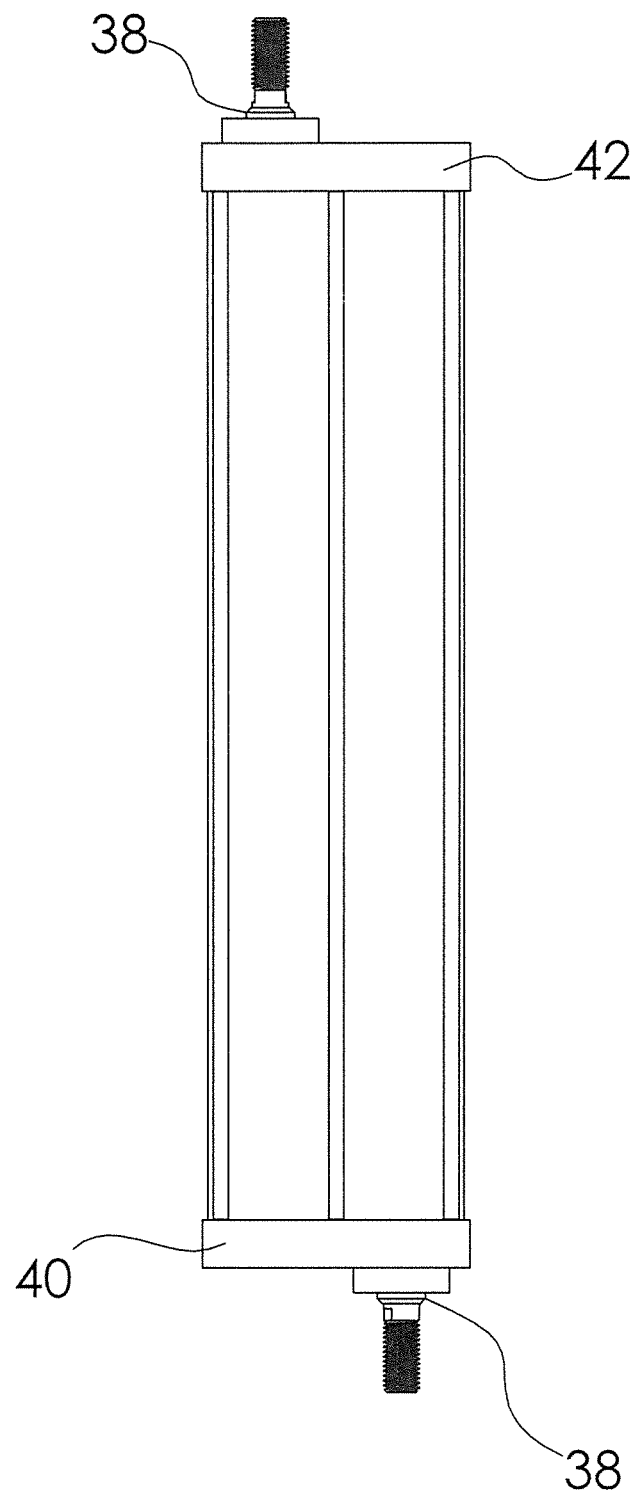
FIGS. 7A and 7B illustrate the dual cylinder assemblies according to the present invention.
Figure 7B:
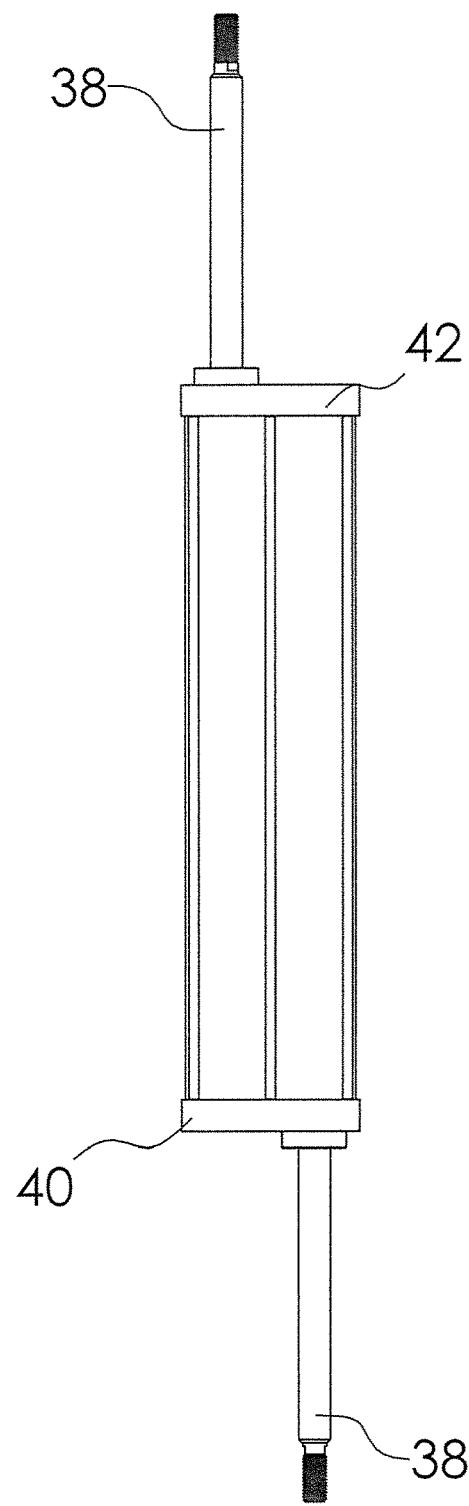

Referring in particular to FIGS. 3, 7A and 7B, each leg assembly 16 and 18 has a left dual cylinder assembly 30 and a right dual cylinder assembly 32 secured in spaced-apart manner between an upper mounting bracket 34 and a lower mounting bracket 36. Each dual cylinder assembly 30 and 32 has two cylinders 38 secured between the brackets 40 and 42. Threaded screws 44 extend from each of the brackets 40, 42 and extend through the mounting brackets 34 and 36 to be secured thereto via sets of nuts 46 and washers 48. Two caster wheel assemblies 50 are secured to the lower mounting bracket 36 via sets of nuts 51. A left channel guide 52 is secured to the left side of the brackets 40 and 42 of the left dual cylinder assembly 30 via corresponding guide mounts 54, screws 56 and washers 58. A right channel guide 60 is secured to the right side of the brackets 40 and 42 of the right dual cylinder assembly 32 via corresponding guide mounts 54, screws 56 and washers 58. Each channel guide 52 and 60 is sized and configured so that they can be secured to the channels of the vertical beams 22 of the frame assembly 14.

The portable cart 10 can be equipped with a self-contained power source (not shown) that is chargeable from the truck alternator or utility AC or Solar Photovoltaic Panel or Generator Set of the truck.

Figure 2:
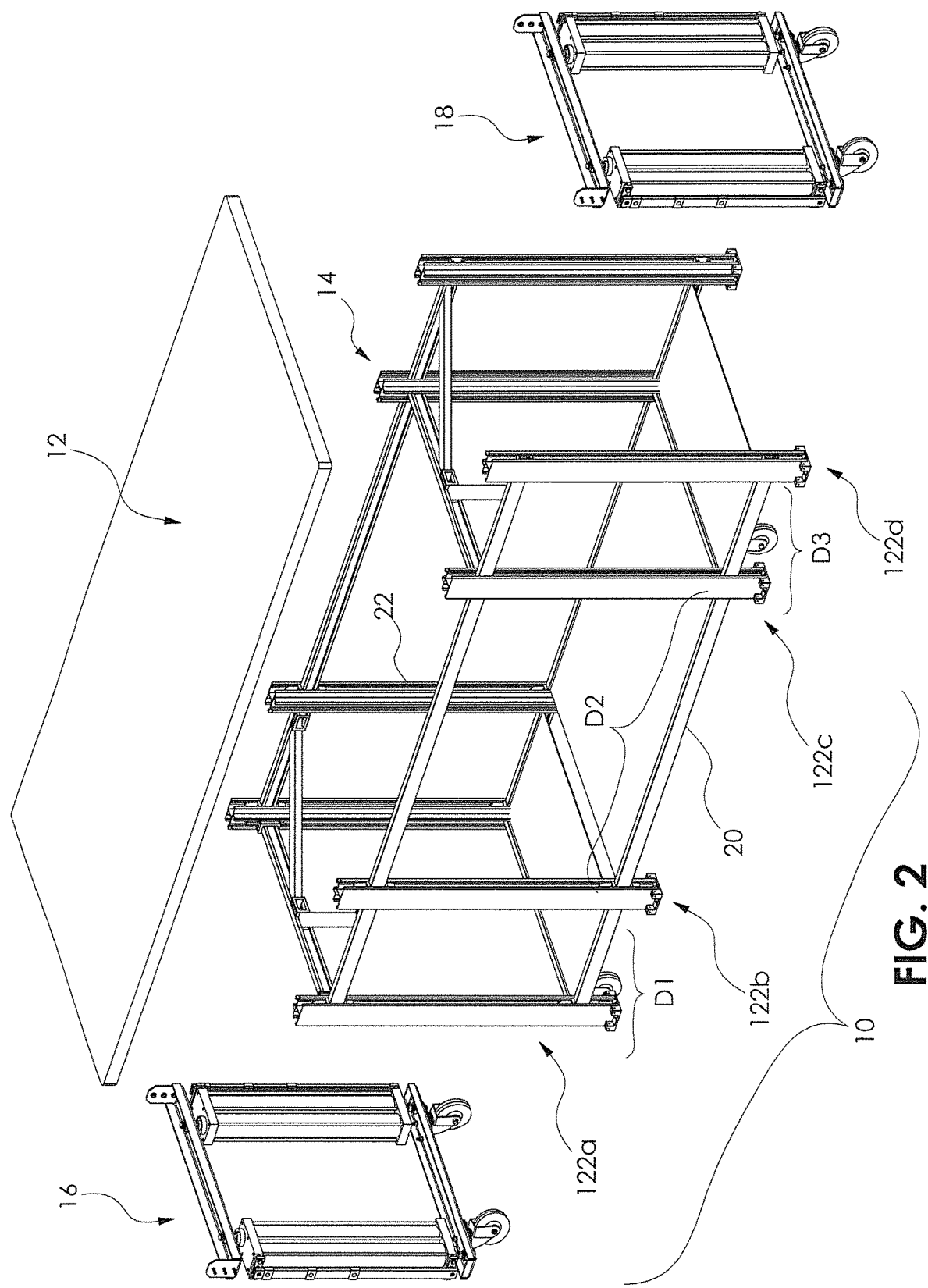
FIG. 2 is an exploded perspective view of the cart of FIG. 1.
Figure 4:
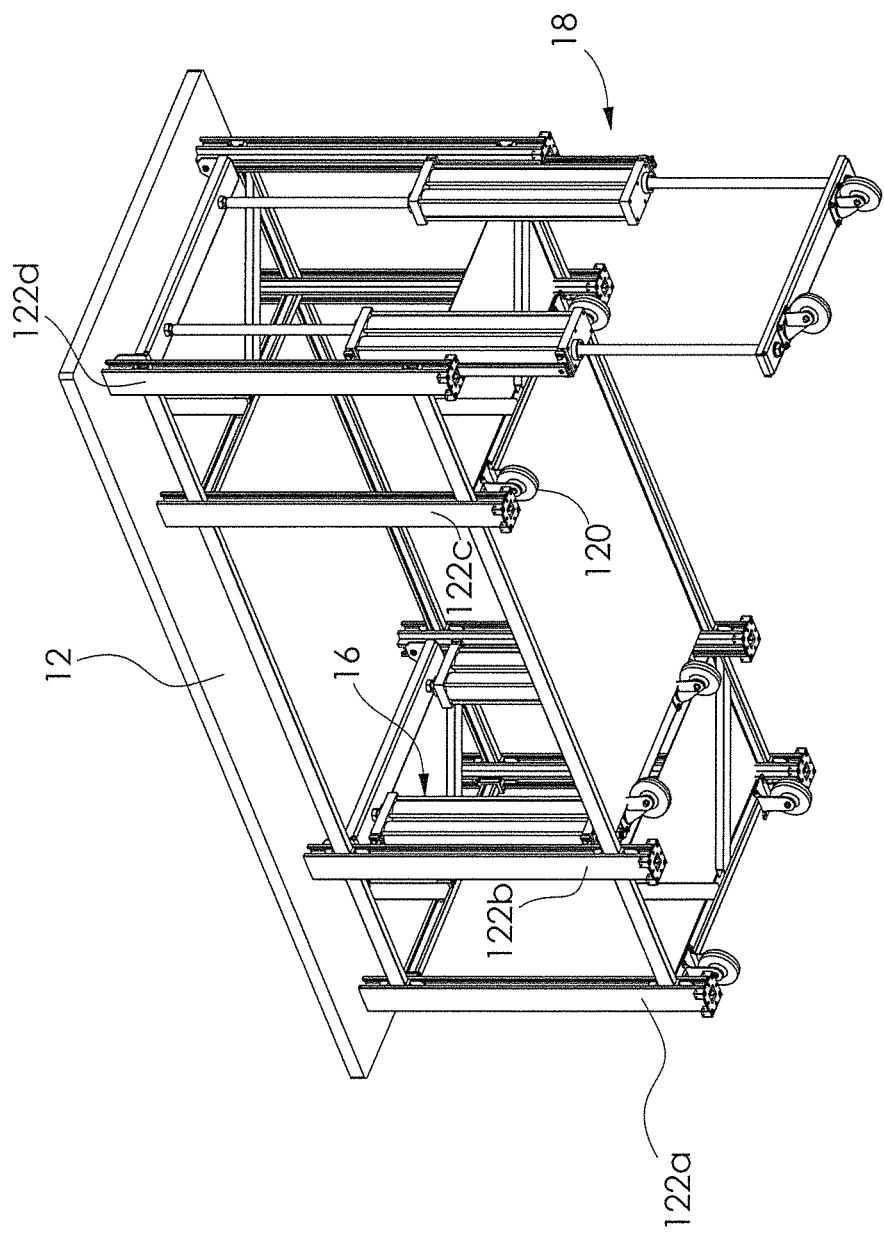
FIG. 4 is a bottom perspective view of the cart of FIG. 1 showing the rear leg assembly being extended.
Figure 5:
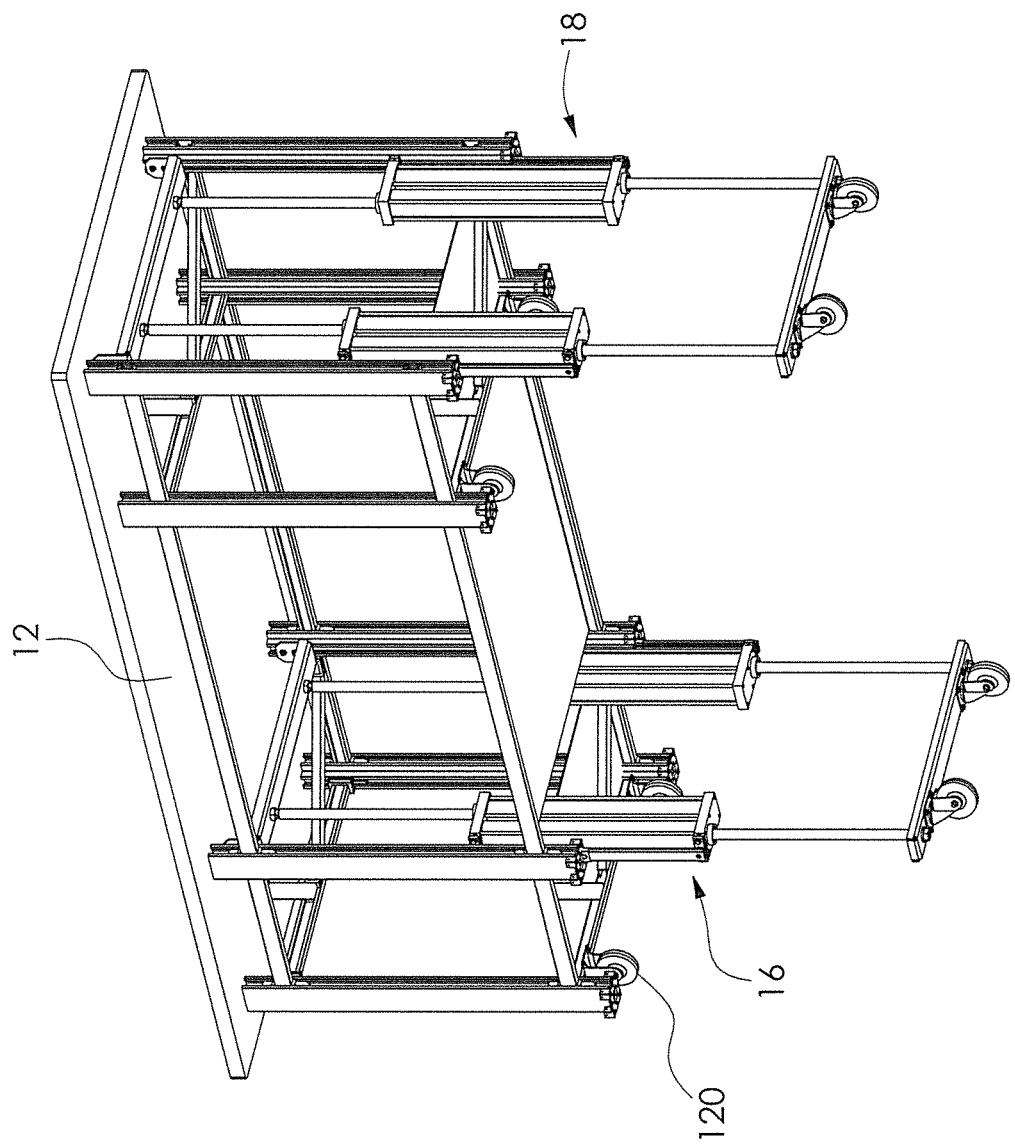
FIG. 5 is a bottom perspective view of the cart of FIG. 1 showing the front and rear leg assemblies being extended.

FIGS. 2, 4 and 5 illustrate the positioning of the leg assemblies 16 and 18 within the frame assembly 14. As used herein, the term "front" shall mean the bulkhead, and the term "rear" shall mean tailgate. The frame assembly 14 has four sets of vertical beams 22, a first front-most set 122a at the very front end of the frame assembly 14, a fourth rear-most set 122d at the very rear end of the frame assembly 14, a second intermediate set 122b, and a third intermediate set 122c. The spacing D1 between sets 122a and 122b is arranged in such a manner that the fixed caster assemblies 120 at the front-most set 122a can support the portable cart 10 on the truck bed while the leg assembly 16 at the second intermediate set 122b is in motion. Similarly, the spacing D3 between sets 122c and 122d is arranged in such a manner that the caster assemblies 120 at the third intermediate set 122c can support the portable cart 10 on the truck bed while the leg assembly 18 at the rear-most set 122d is in motion. The leg assembly 16 is secured to the second set 122b, and the leg assembly 18 is secured to the fourth set 122d. In other words, the leg assembly 18 is secured to the rear of the frame assembly 14, and the leg assembly 16 is secured to the frame assembly 14 at a location offset from the front of the frame assembly 14. D2 is the distance between the sets 122b and 122c. Although D1 and D3 can be the same, this is not necessary.

The caster assemblies 120 are fixed in that they are not extendible in length. In other words, when a caster assembly 120 is secured to the bottom of a vertical beam 22, the length of that vertical beam 22 cannot be changed.

The spacings D1 and D3 are preferably of a constant dimension (e.g., 18" inches), while spacing D2 can variable, depending on the total length of the frame assembly 14.

Figure 6A:
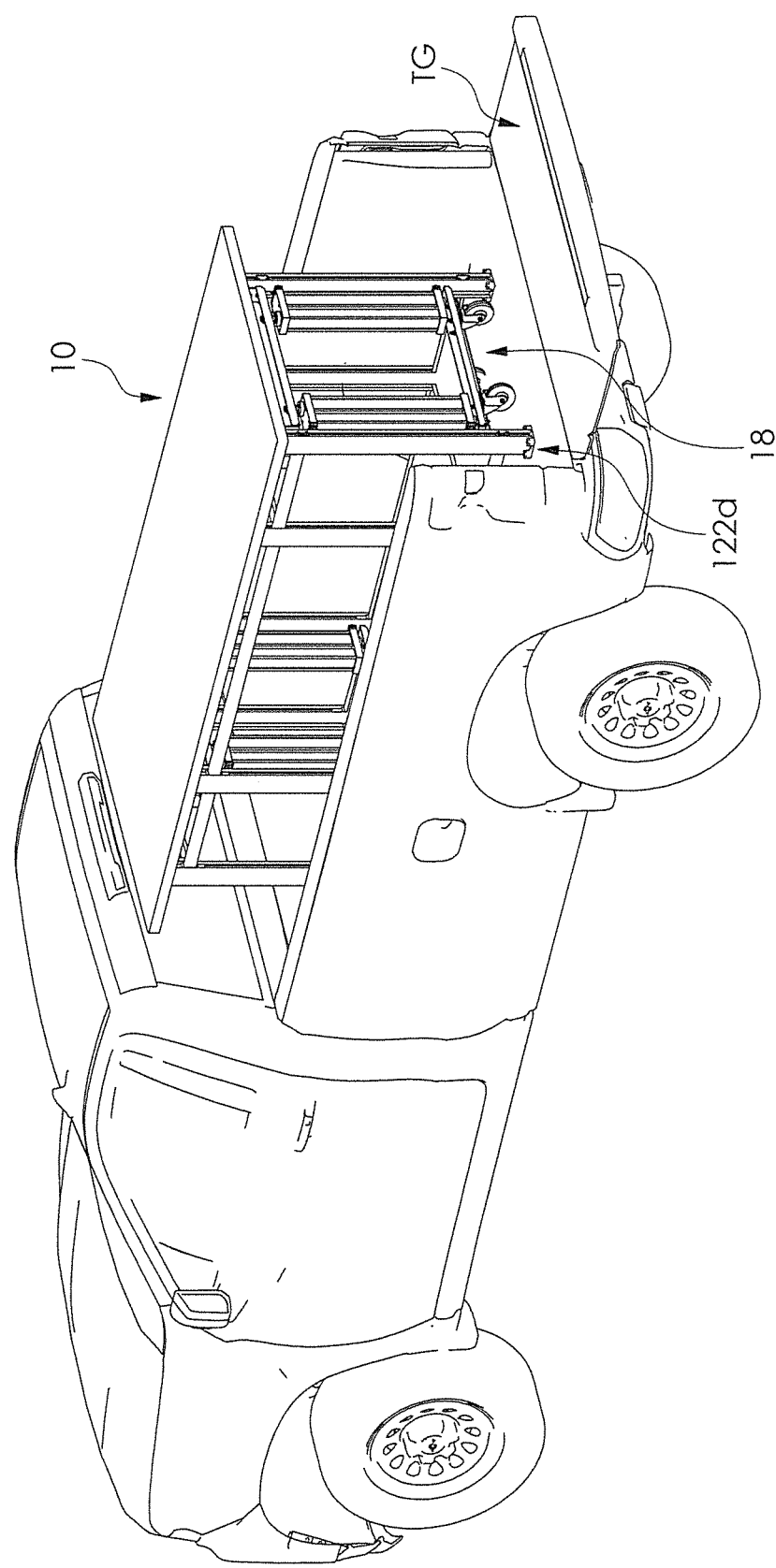
FIGS. 6A-6E illustrate how the portable cart of FIG. 1 is removed from the truck bed of a truck for use at a work site.
Figure 6B:
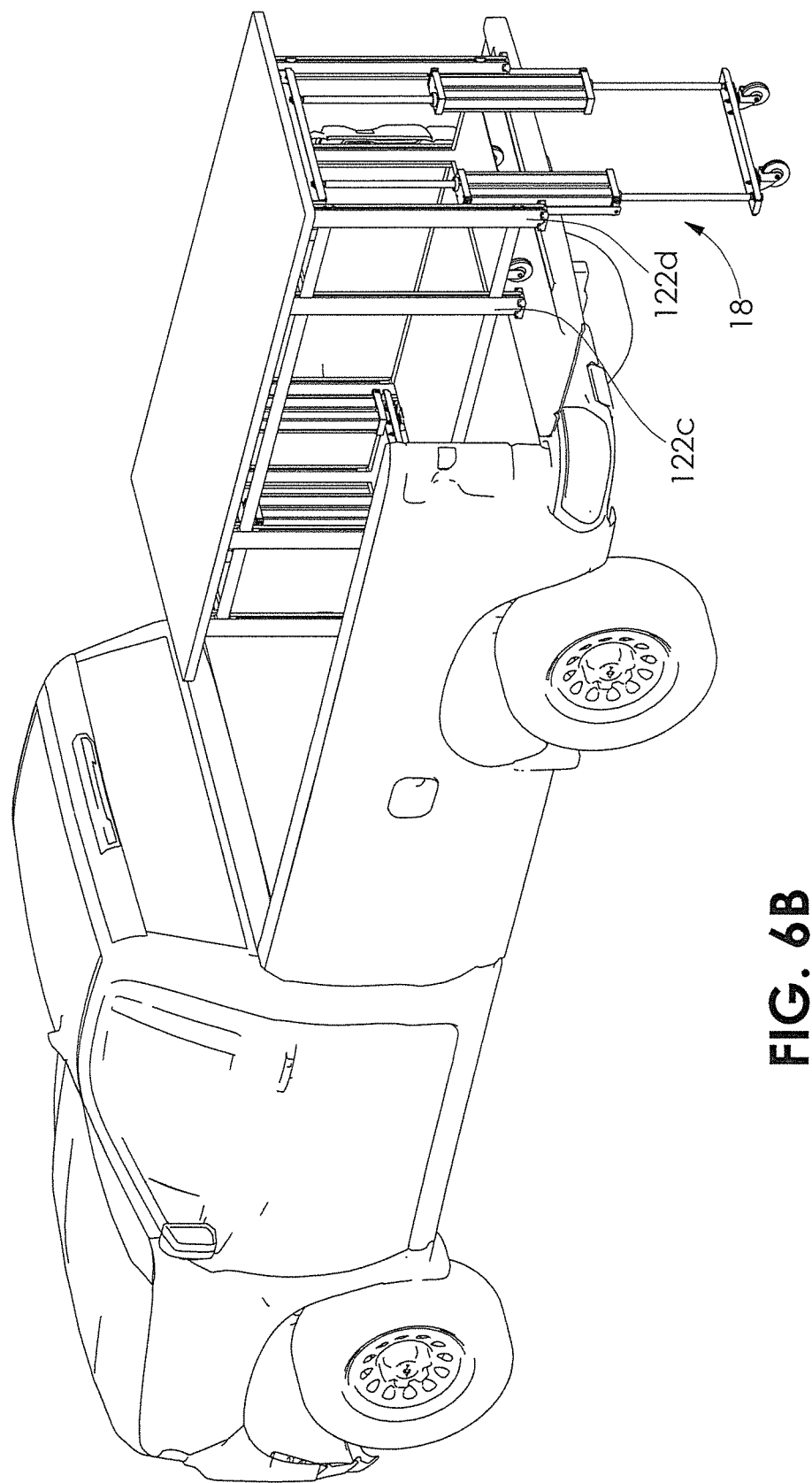
Figure 6C:
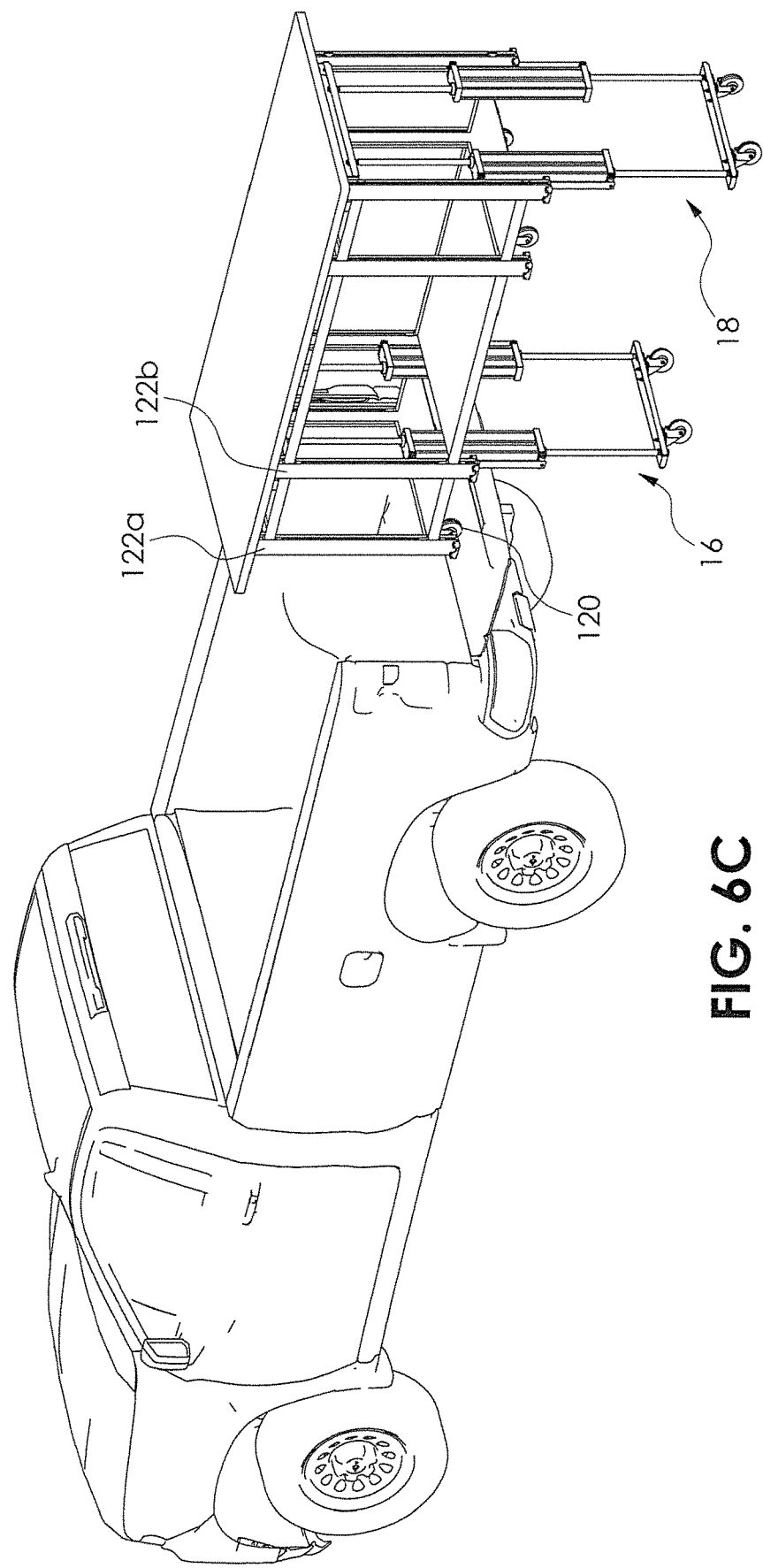
Figure 6D:
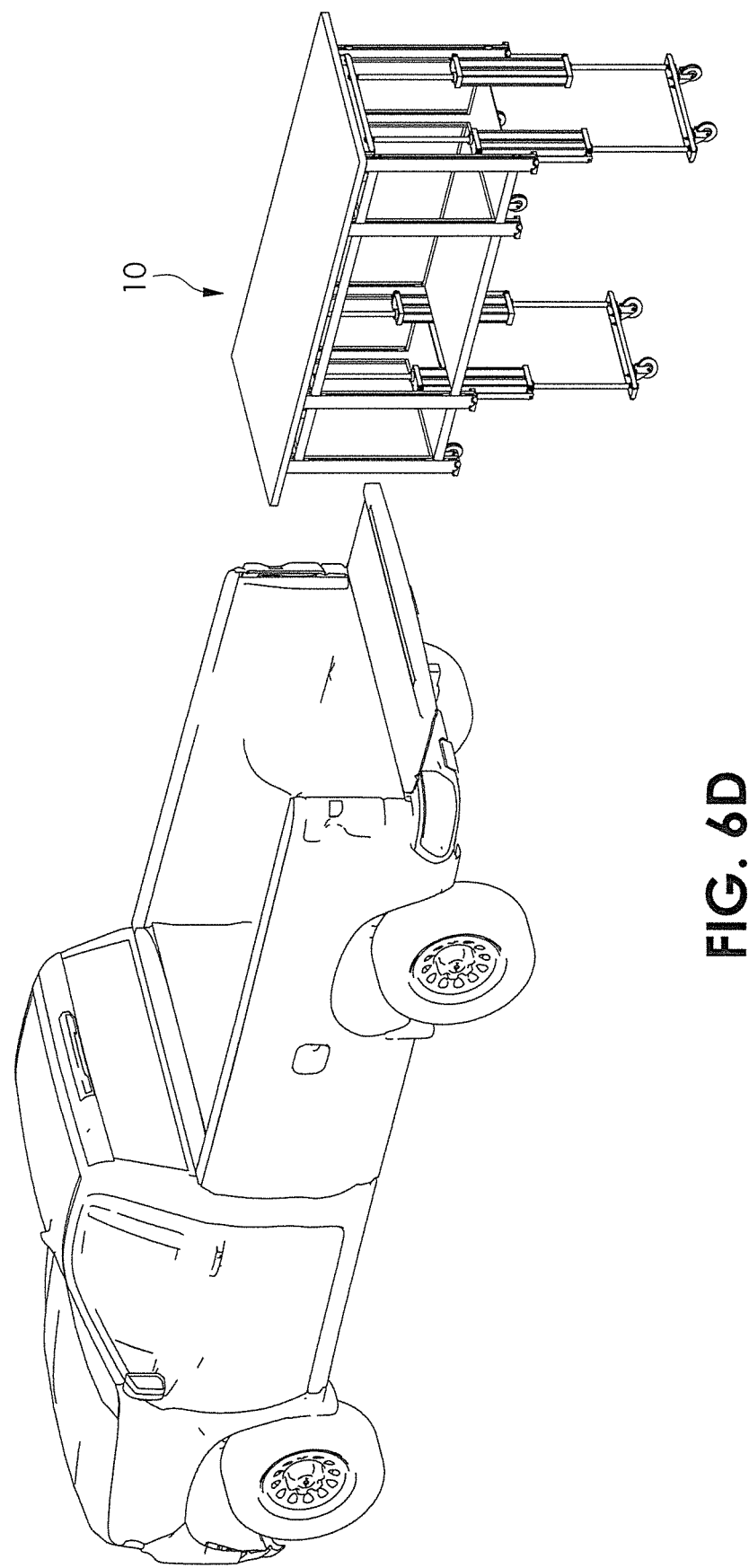
Figure 6E:
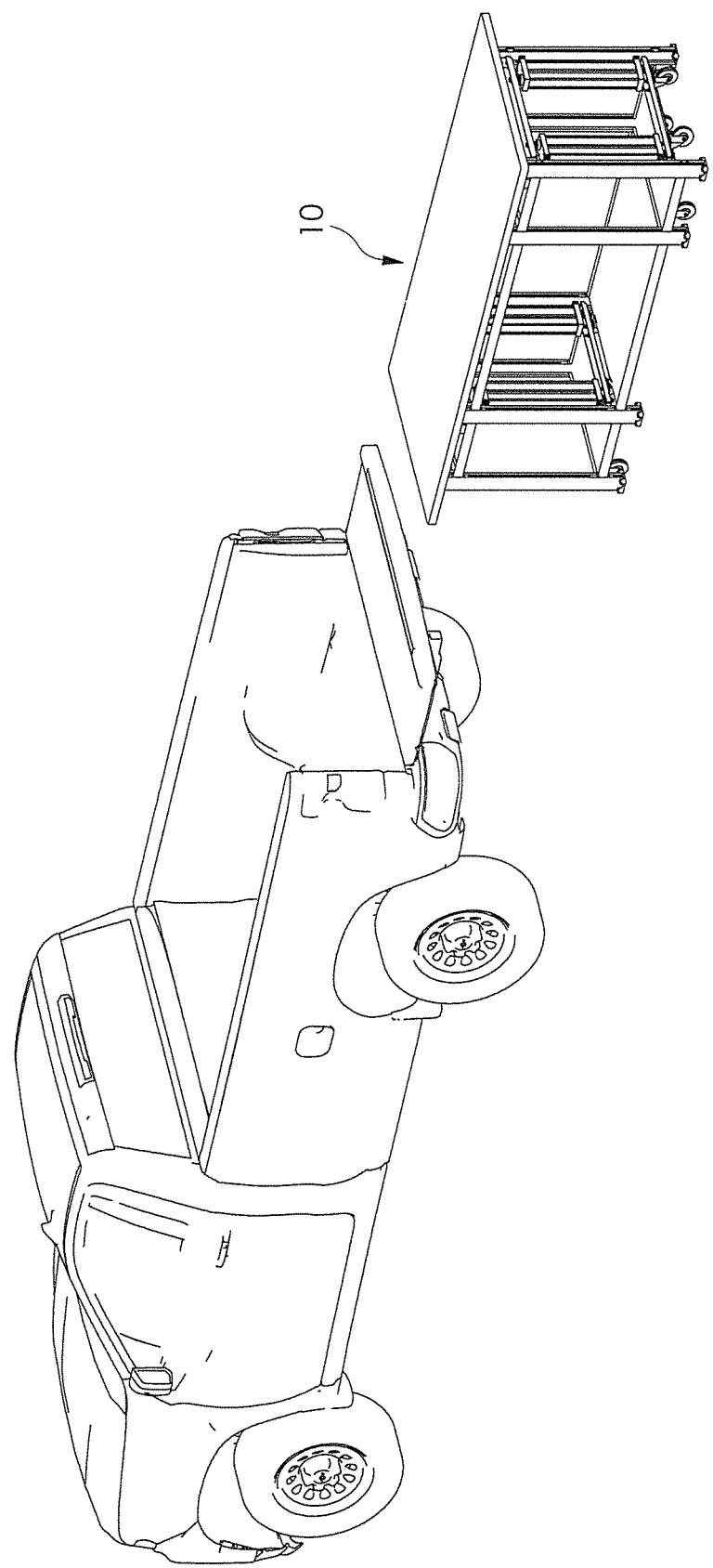

FIGS. 6A-6E illustrate how the portable cart 10 is unloaded from the truck bed to the ground, and the same process can be reversed from FIGS. 6E-6A to upload the portable cart 10 from the ground to the truck bed. As shown in FIGS. 4 and 5, additional fixed caster assemblies 120 are provided at the sets 122a and 122c of vertical beams 22 to facilitate rolling movement of the portable cart 10 on the truck bed or ground, and support on the truck bed. In FIG. 6A, the portable cart 10 is stored on the bed of a truck, and the tailgate TG has been opened. The portable cart is then moved towards the tailgate manually (or powered drive if so equipped) until the leg assembly 18 is off (i.e., clears) the tailgate TG. The caster assemblies 120 on the set 122c of vertical beams 22 support the rear of the portable cart 10 on the tailgate TG. See FIG. 6B. The leg assembly 18 is then actuated in opposite directions to extend the length of the leg assembly 18 (as shown in FIG. 6B) so that the caster wheel assemblies 50 reach the ground to support the rear of the portable cart 10. With the rear leg assembly 18 on the ground, the portable cart 10 can continue to be moved towards the tailgate until the front leg assembly 16 also clears the tailgate TG, as best shown in FIG. 6C. The caster assemblies 120 that are adjacent the front of the portable cart 10 (i.e., on the set 122a) support the front of the portable cart 10 on the tailgate TG (see FIG. 6C). At this time, the front leg assembly 16 can then be actuated to extend the length of the leg assembly 16 (as shown in FIG. 6C) so that the caster wheel assemblies 50 reach the ground to support the front of the portable cart 10. Referring to FIG. 6D, the rest of the front of the portable cart 10 can be moved away from the tailgate TG, and then the leg assemblies 16 and 18 actuated to shorten the leg assemblies 16 and 18. As shown in FIG. 6E, the portable cart 10 is ready for use.

Thus, it can be seen that the four caster assemblies 120 and their corresponding vertical beams 22 act as fixed legs that are used to keep the portable cart 10 in place while the adjustable leg assemblies 16 and 18 are in operating mode.

The portable cart 10 can be loaded back to the truck bed by reversing the steps described above. Specifically, the two leg assemblies 16 and 18 are raised or extended to the configuration shown in FIG. 6D, and then the portable cart 10 is forwarded on to the tailgate TG so that the caster assemblies 120 that are adjacent the front of the portable cart 10 support the front of the portable cart 10 on the tailgate TG (see FIG. 6C). Next, the front leg assembly 16 is shortened and the portable cart 10 pushed on to the truck bed (FIG. 6B) until the rear leg assembly 18 reaches the tailgate TG, with the caster assemblies 120 adjacent the leg assembly 18 supporting the rear of the portable cart 10. Finally, the rear leg assembly 18 is shortened and the rear of the portable cart 10 pushed on to the truck bed (FIG. 6A).

Thus, the kinematics of the portable cart 10 allows it to be stowed or deployed efficiently from the truck bed to ground, and vice versa. In addition, the portable cart can be set at an ideal working height of 38" without any actuators protruding beyond the working surface (table top), as contrasted with FIG. 9. The back-to-back cylinder actuator arrangement not only allows a stable long stroke from the truck bed to reach the ground level, but also provides an ideal working height without any actuators protruding beyond the table top. Thus, the portable cart 10 can be conveniently loaded and unloaded to a standard pickup truck by a single operator (driver) without any additional handling equipment.

The portable cart 10 can be provided with security systems with remote notification to preprogrammed cell phone numbers if equipped with a mobile phone (GPS feature can be activated for pin-point location. In addition, the portable cart 10 can be used as mobile business bench and configured for any specific application, such as a mobile display unit, locksmith mobile business for making or programming automobile keys onsite, mobile point of sale computer system, etc. The portable cart can be provided with built-in power (e.g., a battery) so that the battery can be charging while driving or with engine on.

Figure 8:
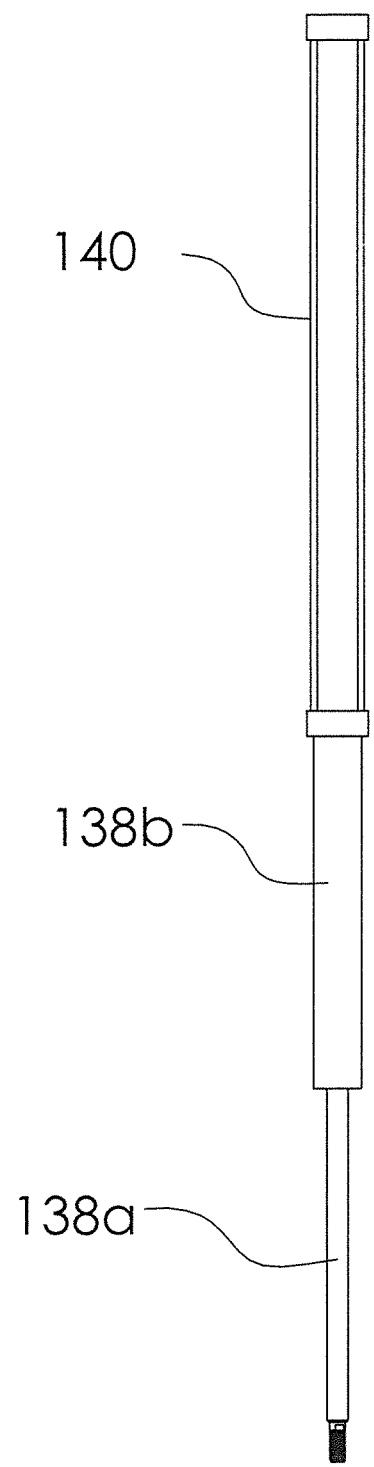
FIG. 8 illustrates a telescopic cylinder assembly according to the present invention.
Figure 10:
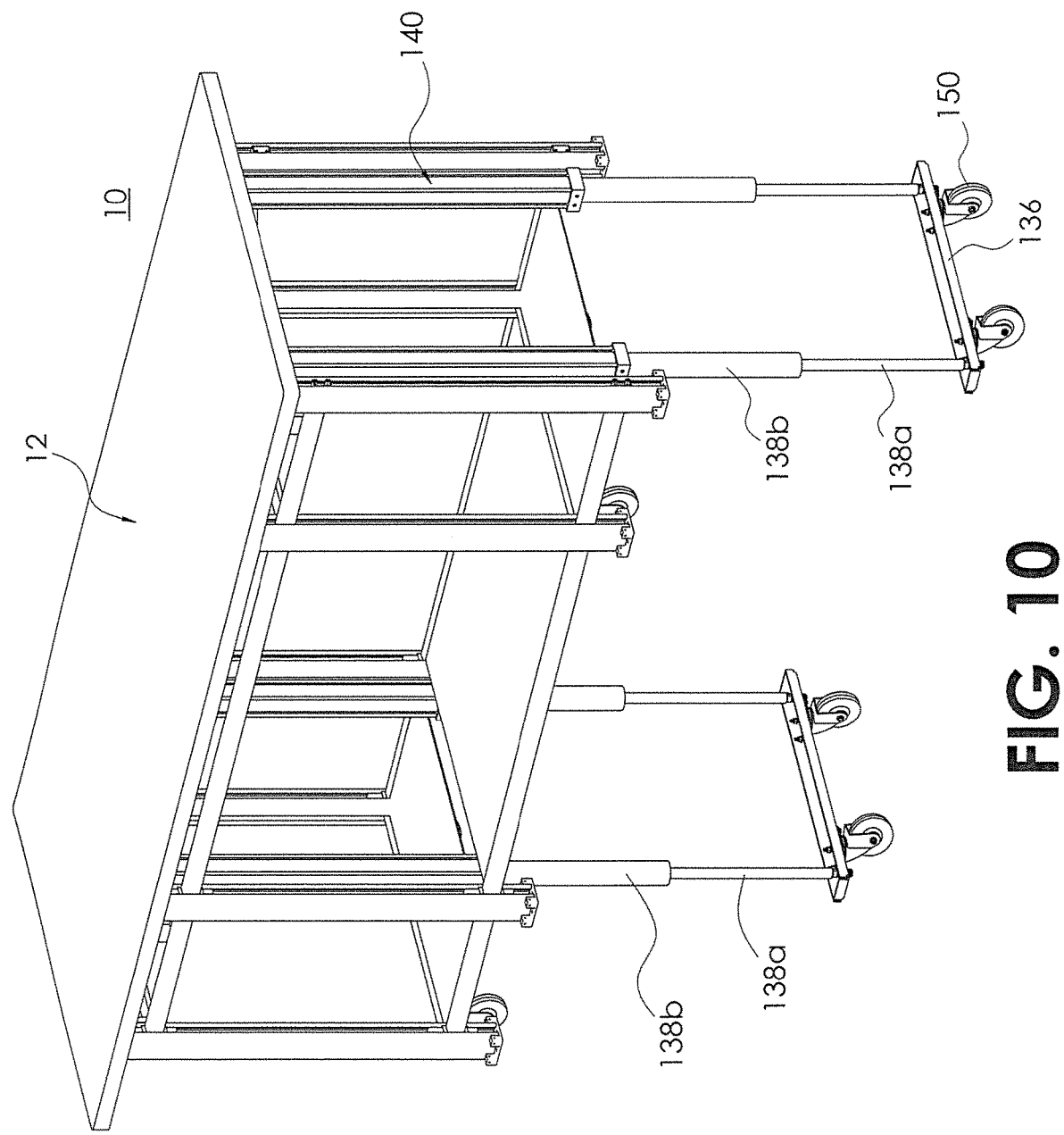
FIG. 10 illustrates a portable cart having a telescopic cylinder assembly according to the present invention

FIGS. 7A and 7B show one embodiment of the dual cylinder assemblies 30 and 32 in the retracted and the extended positions, respectively. FIGS. 8 and 10 show the portable cart 10 having cylinder assemblies 140 using telescopic cylinder actuators 138a and 138b instead of the dual cylinder actuators in the assemblies 30 and 32. However, the telescopic cylinder actuators can be bulky and expensive depending on the number of actuating stages need to reach the desired stroke length and retracted height. This is the reason why the dual cylinder assemblies 30 and 32 are often preferred in some situations, although the telescopic cylinder actuators may be preferred in other situations. Each cylinder assembly 140 can also have similar components as the assemblies 30 and 32, such as a lower mounting bracket 136 and caster wheel assemblies 150.

Figure 9:
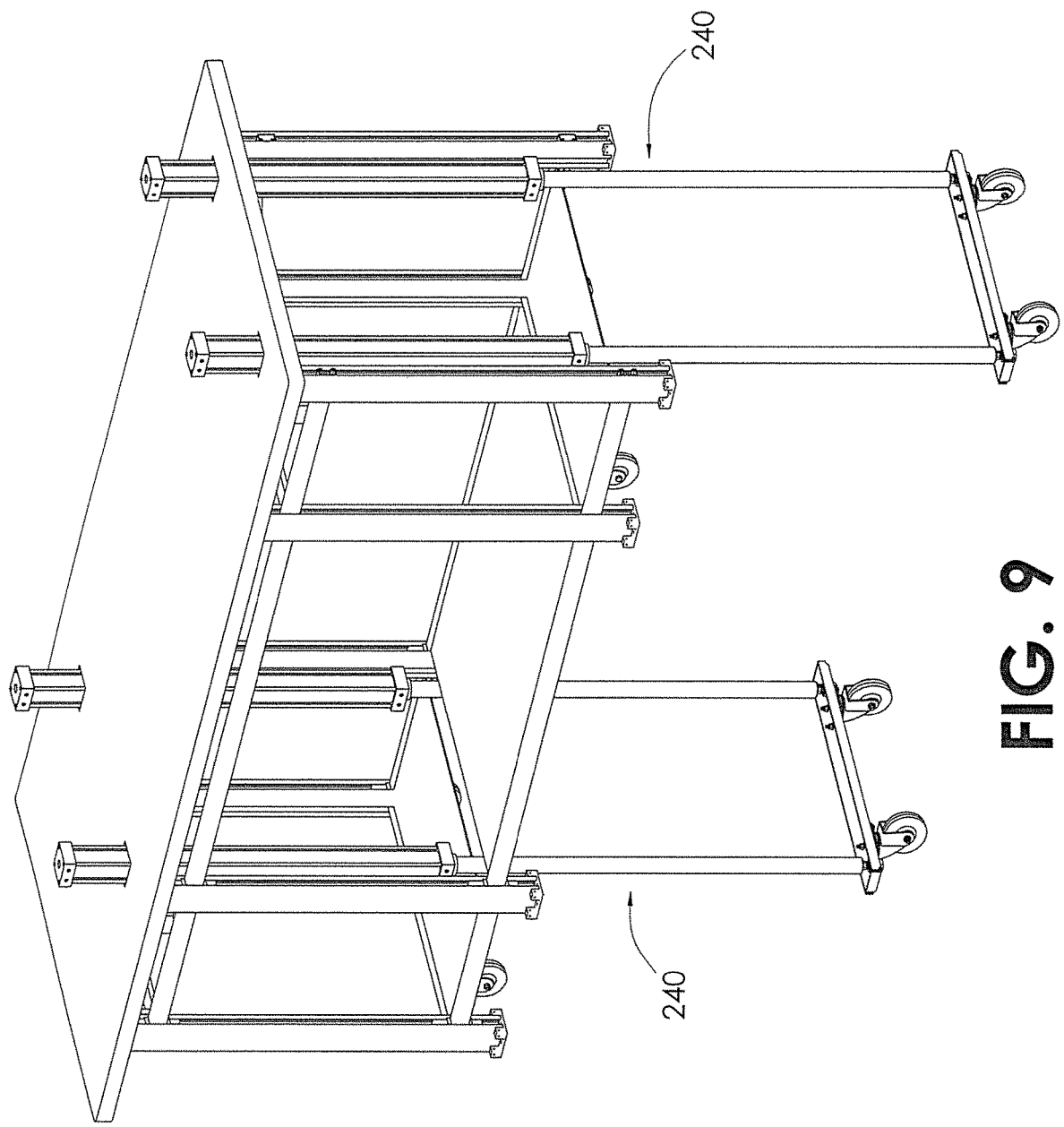
FIG. 9 illustrates a portable cart having a single-actuator assembly according to the present invention.

It is also possible to provide each cylinder assembly in the form of a single-actuator cylinder assembly 240, as shown in FIG. 9. However, when applied to a portable cart with a table top, the top ends of the single actuator would protrude from the top of the table top, so the single-actuator cylinder assembly would not be appropriate for use with a workbench having a typical height Hb between 38 to 42 inches. However, such a single-actuator cylinder assembly can be used for a container without a table top, where the container has a greater height.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A portable cart, comprising:
   a frame assembly having a front end, a rear end, and a plurality of vertical beams;
   a front leg assembly having a pair of extendable front legs, the front leg assembly secured adjacent the front end of the frame assembly;
   a rear leg assembly having a pair of extendable rear legs, the rear leg assembly secured adjacent the rear end of the frame assembly; and
   a table top secured to the frame assembly;
   wherein each leg assembly comprises a left dual cylinder assembly and a right dual cylinder assembly, each cylinder assembly having two cylinders positioned side-by-side.

2. The portable cart of claim 1, wherein each cylinder assembly further includes:
   an upper mounting bracket and a lower mounting bracket, with the two cylinders secured between the upper mounting bracket and the lower mounting bracket; and
   at least one caster wheel assembly secured to the lower mounting bracket.

3. The portable cart of claim 1, wherein each leg assembly further includes:
   a left channel guide secured to the left dual cylinder assembly; and
   a right channel guide secured to the right dual cylinder assembly;
   wherein each channel guide is secured to corresponding vertical beams of the frame assembly.

4. The portable cart of claim 1, wherein each leg assembly comprises a set of telescoping actuators.

5. A portable cart, comprising:
   a frame assembly having a front end, a rear end, and a plurality of vertical beams;
   a front leg assembly having a pair of extendable front legs, the front leg assembly secured adjacent the front end of the frame assembly;
   a rear leg assembly having a pair of extendable rear legs, the rear leg assembly secured adjacent the rear end of the frame assembly; and a table top secured to the frame assembly;
wherein the frame assembly has at least a first set of vertical beams positioned at the front end of the frame assembly, a fourth set of vertical beams positioned at the rear end of the frame assembly, a second set of vertical beams positioned spaced apart from the first set of vertical beams, and a third set of vertical beams positioned between the second and fourth sets of vertical beams, wherein at least one fixed caster assembly is secured to the first and third sets of vertical beams, the front leg assembly is secured to the second set of vertical beams, and the rear leg assembly is secured to the fourth set of vertical beams.

\* \* \* \* \*